United States Patent
Kurian et al.

(10) Patent No.: US 10,958,733 B2
(45) Date of Patent: Mar. 23, 2021

(54) DEVICE CONTROL BASED ON ACTION COMPLETION

(71) Applicant: BANK OF AMERICA CORPORATION, Charlotte, NC (US)

(72) Inventors: Manu Jacob Kurian, Dallas, TX (US); Gopikrishna Nemalikanti, Frisco, TX (US); Albena Noveva Fairchild, Indian Trail, NC (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

(21) Appl. No.: 16/130,213

(22) Filed: Sep. 13, 2018

(65) Prior Publication Data

US 2020/0092373 A1    Mar. 19, 2020

(51) Int. Cl.
| | | |
|---|---|---|
| *G06F 15/173* | (2006.01) | |
| *H04L 29/08* | (2006.01) | |
| *G06Q 10/10* | (2012.01) | |
| *H04W 4/12* | (2009.01) | |

(52) U.S. Cl.
CPC ....... *H04L 67/125* (2013.01); *G06Q 10/1097* (2013.01); *H04L 67/18* (2013.01); *H04L 67/22* (2013.01); *H04L 67/26* (2013.01); *H04W 4/12* (2013.01)

(58) Field of Classification Search
CPC ......... H04L 67/12; H04L 67/18; H04L 67/22; H04L 67/26; H04L 67/125; G06Q 10/1097
See application file for complete search history.

(56) References Cited

U.S. PATENT DOCUMENTS

| | | |
|---|---|---|
| 5,493,692 A | 2/1996 | Theimer et al. |
| 5,741,616 A | 4/1998 | Hirano et al. |
| 5,850,753 A | 12/1998 | Varma |
| 5,872,834 A | 2/1999 | Teitelbaum |
| 5,977,964 A | 11/1999 | Williams et al. |
| 6,104,913 A | 8/2000 | McAllister |
| 6,104,922 A | 8/2000 | Baumann |
| 6,204,763 B1 | 3/2001 | Sone |
| 6,256,019 B1 | 7/2001 | Allport |
| 6,331,972 B1 | 12/2001 | Harris et al. |
| 6,487,180 B1 | 11/2002 | Borgstahl et al. |
| 6,963,851 B1 | 11/2005 | Szabo et al. |
| 6,965,871 B1 | 11/2005 | Szabo et al. |

(Continued)

*Primary Examiner* — Jonathan A Bui
(74) *Attorney, Agent, or Firm* — Michael A. Springs; Moore & Van Allen PLLC; Jeffrey R. Gray (57) ABSTRACT

The system provides the ability for primary users (e.g., parents, or the like) to assign actions to dependent users (e.g., kids, or the like) through the use of devices located at the location of the dependent users (e.g., home, or the like). The actions may be tasks for the dependent users to complete using devices (e.g., appliances or other devices). Moreover, the primary users can monitor if the dependent users are undertaking the assigned actions using the devices, and in response, may control the use of other devices at the same location (e.g., entertainment devices) until the dependent users undertake the actions (e.g., start, complete, etc. the actions). Assignment of the actions and control of the devices may be made automatically in order to aid in achieving the one or more desired actions. Notification of the actions and/or instructions on how to perform the actions may pushed to the devices.

19 Claims, 4 Drawing Sheets

(56) References Cited

U.S. PATENT DOCUMENTS

| | | |
|---|---|---|
| 7,130,814 B1 | 10/2006 | Szabo et al. |
| 7,483,964 B1 | 1/2009 | Jackson et al. |
| 7,885,844 B1* | 2/2011 | Cohen ................... G06Q 10/10 |
| 8,483,738 B2* | 7/2013 | Kemery ............. G06F 21/6218 |
| | | 434/238 |
| 8,538,807 B2 | 9/2013 | Dishneau et al. |
| 8,543,087 B2 | 9/2013 | Davis et al. |
| 8,774,757 B2 | 7/2014 | Davis et al. |
| 9,491,181 B2 | 11/2016 | Formo et al. |
| 9,853,826 B2 | 12/2017 | Shuman et al. |
| 9,942,336 B2* | 4/2018 | Bostick ............ H04L 29/08936 |
| 2011/0237227 A1* | 9/2011 | Kemery ................ G06F 21/629 |
| | | 455/414.1 |
| 2012/0215328 A1* | 8/2012 | Schmelzer ............ G06Q 30/02 |
| | | 700/91 |
| 2014/0255889 A1* | 9/2014 | Grimes ................. G09B 19/00 |
| | | 434/236 |
| 2014/0272894 A1* | 9/2014 | Grimes ................. G09B 5/125 |
| | | 434/350 |
| 2014/0297348 A1 | 10/2014 | Ellis |
| 2015/0007307 A1* | 1/2015 | Grimes ................... G09B 7/02 |
| | | 726/18 |
| 2015/0026002 A1 | 1/2015 | Mangalvedkar et al. |
| 2015/0026007 A1 | 1/2015 | Mangalvedkar et al. |
| 2015/0111559 A1* | 4/2015 | Leaver ................... H04W 8/22 |
| | | 455/418 |
| 2015/0156267 A1* | 6/2015 | Zhang ..................... H04W 4/02 |
| | | 709/223 |
| 2016/0140478 A1* | 5/2016 | Hambrick ...... G06Q 10/063112 |
| | | 705/7.14 |
| 2016/0314514 A1 | 10/2016 | High et al. |
| 2016/0330078 A1* | 11/2016 | Bostick ................... H04W 4/21 |
| 2017/0017821 A1 | 1/2017 | Hibara et al. |
| 2017/0032446 A1 | 2/2017 | Merz et al. |
| 2017/0109951 A1* | 4/2017 | Jiang ................... G07C 9/00182 |
| 2017/0142023 A1 | 5/2017 | Yadav et al. |
| 2017/0178531 A1* | 6/2017 | Swank ..................... G09B 7/08 |
| 2017/0230515 A1* | 8/2017 | Velusamy ............... H04W 4/24 |
| 2017/0262926 A1 | 9/2017 | High et al. |
| 2018/0137457 A1 | 5/2018 | Sachs et al. |
| 2018/0167471 A1* | 6/2018 | Parkar ................... H04L 67/306 |
| 2019/0026482 A1* | 1/2019 | Kenny .................. G06F 21/604 |
| 2019/0180218 A1* | 6/2019 | Vigneswaran .............................. |
| | | G06Q 10/063116 |
| 2019/0279116 A1* | 9/2019 | Caligor ................... G06Q 10/00 |
| 2019/0340346 A1* | 11/2019 | Gibbs ................ G06Q 10/1097 |
| 2020/0053540 A1* | 2/2020 | Dames ................... H04L 67/12 |
| 2020/0223635 A1* | 7/2020 | Govindaswamy ... B65G 1/1375 |

* cited by examiner

DEVICE CONTROL BASED ON ACTION COMPLETION

FIELD

The present invention relates to controlling devices based on action completion, and more particularly to determining users in a particular location, assigning actions, and controlling devices within the location based on the actions of the users at the location.

BACKGROUND

When parents are not at the house, being able to assign tasks to kids at the house is difficult because the kids may not know how to perform the tasks, may perform the tasks incorrectly, and/or simply ignore the tasks assigned to them. This holds true or anyone assigning a task to another person, when the people are not located in the same place. As such, there is a need to provide better control over the ability of a person, such as a parent, to assign, monitor, and control the tasks of others, such as kids, and provide ways to implement consequences if the tasks are not completed.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer products, and methods are described herein for an action assignment, action and device monitoring, and device control system. Such a system allows primary users (e.g., parents, or the like) to assign actions to dependent users (e.g., kids, or the like) through the use of devices located at the location of the dependent users (e.g., home, or the like). The actions may be tasks for the dependent users to complete using devices (e.g., action devices—e.g., appliances or other devices through which the user can undertake the actions) that are at the same location as the dependent users. Moreover, the primary users can monitor if the dependent users are undertaking the assigned actions using the devices, and in response, may control the use of other devices at the same location (e.g., entertainment devices—e.g., smart TV, game counsels, or the like) until the dependent users undertake the actions (e.g., start, make progress, complete, or the like, the actions). It should be understood that in some embodiments assignment of the actions and control the devices may be made automatically in order to aid in achieving the one or more desired actions.

It should be understood that the notification of the actions and/or instructions on how to perform the actions may pushed to the mobile devices of the dependent users, as well as the devices at the same location as the dependent users, such that the dependent users cannot ignore notifications sent to the mobile devices of the dependent users.

The present invention allows the primary users to assign, monitor, and/or control the actions of the dependent users even when the primary user is not located at the same place as the dependent users. As such, the present invention provides technical solutions to the technical problems of assigning, monitoring, and controlling devices of dependent users in order to complete the actions that are required at a particular location.

Embodiments of the present invention comprise systems, computer implemented methods, and/or computer program products for controlling devices based on action occurrence. Embodiments of the invention comprise identifying, based at least in part on input from one or more primary users, one or more actions for one or more dependent users to undertake using one or more devices; assigning the one or more actions to the one or more dependent users; notifying the one or more dependent users of the one or more actions; monitoring the one or more devices for occurrence of the one or more actions; and controlling operation of at least one of the one or more devices based on the occurrence of the one or more actions by the one or more dependent users.

In further accord with embodiments of the invention, the one or more devices comprise one or more action devices and one or more entertainment devices, and wherein the one or more actions occur through use of the one or more action devices and control of the operation of the at least one of the one or more devices comprises controlling the one or more entertainment devices.

In other embodiments of the invention, identifying the one or more actions for the one or more dependent users to undertake comprises receiving the one or more actions from the one or more primary users and the one or more devices associated with the one or more actions, and assigning the one or more actions comprises the one or more primary users assigning the one or more actions to the one or more dependent users.

In still other embodiments of the invention, identifying the one or more actions for the one or more dependent users comprises capturing information automatically from the one or more devices and determining the one or more actions based on the information captured from the one or more devices.

In yet other embodiments of the invention, assigning the one or more actions for the one or more dependent users comprises identifying a location for the one or more dependent users and assigning the one or more actions based at least in part on the location of the one or more dependent users.

In further accord with embodiments of the invention, a first action of the one or more actions is assigned to one of the one or more dependent users located away from a household, and wherein a second action is assigned to another of the one or more dependent users located at the household.

In other embodiments of the invention, assigning the one or more actions for the one or more devices comprises identifying abilities of the one or more dependent users, and assigning one of the one or more actions to one of the one or more dependent users and another of the one or more actions to another of the one or more dependent users based on the abilities of the one or more dependent users.

In yet other embodiments of the invention, notifying the one or more dependent users of the one or more actions assigned comprises displaying the one or more actions and one or more devices used for the one or more actions on an interface on the one or more devices.

In still other embodiments of the invention, notifying the one or more dependent users comprises sending a notification to a user computer system of the one or more dependent users.

In further accord with embodiments of the invention, monitoring the one or more devices for the occurrence of the one or more actions comprises determining when the one or more actions are completed, and wherein controlling the operation of the one or more devices comprise allowing the one or more dependent users to use the one or more devices.

In other embodiments of the invention, monitoring the one or more devices for the occurrence of the one or more actions comprises determining when the one or more actions have failed to occur, and notifying the one or dependent users when the one or more actions have failed to occur.

In still other embodiments of the invention, at least one of the one or more action devices are the same as at least one of the one or more entertainment devices.

In yet other embodiments of the invention, the one or more action devices comprise a personal household assistant, a smart thermostat, a smart stove, a smart refrigerator, a smart washer, a smart dryer, a smart door, a smart pet device, or a smart appliance.

In further accord with embodiments of the invention, the one or more entertainment devices comprises a user mobile device, a smart TV, smart speakers, a router, a game counsel, a transportation device, or a wearable device.

In other embodiments of the invention, the one or more actions are chores for the dependent users to complete at a location shared by the one or more dependent users and the one or more primary users.

In still other embodiments of the invention, the one or more actions are a transfer of funds from the one or more dependent users to the one or more primary users.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Systems, methods, and computer program products are herein disclosed for an action assignment, action and device monitoring, and device control system. Such a system allows primary users (e.g., parents, or the like) to assign actions to dependent users (e.g., kids, or the like) through the use of devices located at the location of the dependent users (e.g., home, or the like). The actions may be tasks for the dependent users to complete using devices (e.g., action devices—e.g., appliances or other devices through which the user can undertake the actions) that are at the same location as the dependent users. Moreover, the primary users can monitor if the dependent users are undertaking the assigned actions using the devices, and in response, may control the use of other devices at the same location (e.g., entertainment devices—e.g., smart TV, game counsels, or the like) until the dependent users undertake the actions (e.g., start, make progress, complete, or the like, the actions). It should be understood that in some embodiments assignment of the actions and control the devices may be made automatically in order to aid in achieving the one or more desired actions.

The devices and applications thereof discussed herein may be linked (e.g., in a centralized location or the like) to allow monitoring of the devices and/or applications (e.g., manually by the user or automatically by the system). As such, as will be discussed in further detail below, the assignment of actions and devices, occurrence of actions on the devices, and control of the devices in response to the occurrence of actions may be monitored, and moreover, the devices (including the applications thereof) may be controlled based on the occurrence of the actions by particular users using particular devices.

Figure 1:
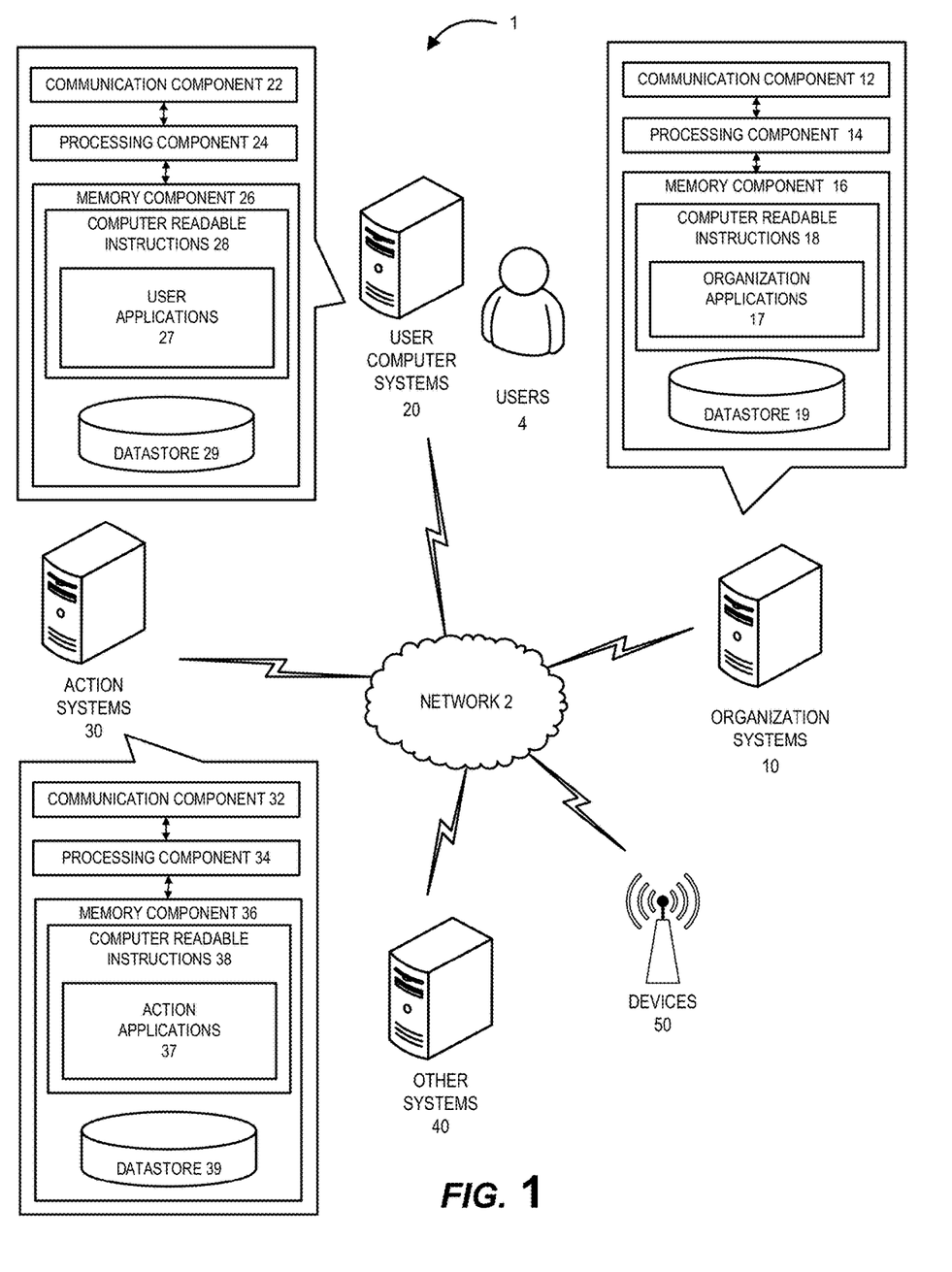
FIG. 1 illustrates a block diagram of an action assignment, monitoring, and device control system environment, in accordance with some embodiments of the invention.

FIG. 1 illustrates an action control system environment 1, in accordance with some embodiments of the invention. As illustrated in FIG. 1, one or more organization systems 10 are operatively coupled, via a network 2, to one or more user computer systems 20, one or more action systems 30, one or more other systems 40, and/or one or more devices 50. In this way, a user 4 (e.g., parent, guardian, owner, or the like), such as a primary user 4 may assign, monitor and/or control actions and associated devices 40 that the other users 4, such as dependent users (e.g., dependents, kids, roommates, or the like living in the same house as the primary users, or the like), may use (e.g., turn on, operate, use a particular application thereof, or the like). As such, one or more organization applications 17 may allow and/or facilitate the user computer systems 20 to accesses, communicate and/or use (e.g., send or receive data from, control, or the like) the actions applications 37 and/or the devices 50 and/or applications thereof directly or through the organization or third parties. It should be understood that the organization may have a relationships with one or more users, and as such may be a centralized location through which the users can accessed and control devices (including applications thereof) that are owned and/or operated by third party entities. Moreover, the one or more action systems 30 may be controlled by the organization and/or may be controlled by another entity, and the organization may communicate with the one or more action systems 30 controlled by another entity.

In some embodiments of the invention the one or more organization systems 10 may monitor, store, and provide information related to the user computer applications 27, the action applications 37, and/or devices 50 and applications thereof, in order to help one or more primary users 4 (e.g., head of household, owner of devices, parent, guardian, or the like) control the devices 50 and/or use thereof by dependent users 4 (e.g., other users, kids, roommates, or the like), as will be discussed herein.

The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the organization systems 10 generally comprise one or more communication components 12, one or more processing components 14, and one or more memory components 16. The one or more processing components 14 are operatively coupled to the one or more communication components 12 and the one or more memory components 16. As used herein, the term "processing component" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 2 and other components on the network 2, such as, but not limited to, the user computer systems 20, the financial institution systems 30, other systems 40 (e.g., third-party systems, or the like), and/or devices 50. As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 1, the organization systems 10 comprise computer-readable instructions 18 stored in the memory component 16, which in one embodiment includes the computer-readable instructions 18 of one or more organization applications 17. In some embodiments, the one or more memory components 16 include one or more datastores 19 for storing data related to the one or more organization systems 10, including, but not limited to, data created, accessed, and/or used by the one or more organization applications 17. The one or more organization applications 17 may be tools, websites, mobile device apps, other computer system apps, applets, combinations or multiples thereof, or the like that are used to store information about users 4 and/or devices 50, communicate with users 4 and/or devices 50, monitor dependent users 4 or devices 50 thereof, and/or allow the primary users to assign, monitor, and/or control the actions that the dependent users can take on the devices 50 and/or applications thereof.

As illustrated in FIG. 1, users 4 may access the organization applications 17, the action applications 37, the applications of the other systems 40, and/or the devices 50 and/or applications thereof, through one or more user computer systems 20. For example, primary users may access the various systems for setting actions, monitoring actions, controlling devices and/or applications thereof, or the like of the dependent users. The dependent users may access the systems, devices, and/or applications thereof to determine the actions assigned, update the progress of the actions, and determine the devices and/or the applications to which the dependent user is allowed access and/or use.

As illustrated in FIG. 1, the user computer system 20, which may be a desktop, laptop, tablet, mobile device (e.g., smartphone device, or other mobile device), or any other type of computer, generally comprises one or more communication components 22, one or more processing components 24, and one or more memory components 26. The one or more processing components 24 are operatively coupled to the one or more communication components 22, and the one or more memory components 26. The one or more processing components 24 use the one or more communication components 22 to communicate with the network 2 and other components on the network 2, such as, but not limited to, the one or more organization systems 10, the one or more action systems 30, the one or more other systems 40, and/or the one or more devices 50, which may or may not be specifically illustrated in FIGS. 2 and 3 and/or otherwise described herein. As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, mouse, joystick, other pointer component, button, soft key, and/or other input/output component(s) for communicating with the users 4.

As illustrated in FIG. 1, the user computer systems 20 may have computer-readable instructions 28 stored in the one or more memory components 26, which in one embodiment includes the computer-readable instructions 28 of applications 27, such as dedicated applications (e.g., apps, applet, or the like), portions of dedicated applications, web browser or other apps that allow access to applications located on other systems, or the like. The applications 27 may include any type of application that the user may utilize, such as but in no way limited to, an appliance application, a wearable device application, a shopping application, a financial account application, a budgeting application, media application, social media application, exercise application, or any other type of application which may or may not be explicitly discussed herein. It should be understood that the applications 27 may be associated with and control the devices 50, or the applications 27 may be separate from specific dedicated devices 50, or may be a combination thereof (e.g., some applications 27 related to and used for controlling the devices 50, and some applications that are unrelated to the devices 50).

As illustrated in FIG. 1, the one or more action systems 30 are operatively coupled to the one or more organization systems 10, the one or more user computer systems 20, other systems 40, the devices 50, or the like, through the network 2. Like the one or more organization systems 10 and/or the one or more user computer systems 20, the one or more action systems 30 generally comprise one or more communication components 32, one or more processing components 34, and one or more memory components 36. The one or more processing components 34 are operatively coupled to the one or more communication components 32, and the one or more memory components 36. The one or more processing components 34 use the one or more communication components 32 to communicate with the network 2 and other components on the network 2, such as, but not limited to, the one or more organization systems 10, the one or more user computer systems 30, the one or more other systems 40, and/or the devices 50, which may or may not be specifically illustrated in FIGS. 2 and 3 and/or otherwise described herein. As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

As illustrated in FIG. 1, the action systems 30 may have computer-readable instructions 38 stored in the one or more memory components 36, which in one embodiment includes the computer-readable instructions 38 of action applications 37, such as dedicated applications (e.g., apps, applet, or the like), portions of dedicated applications, web browser or other apps that allow access to applications located on other systems, the other systems, devices, or the like. The applications 37 may include any type of application that the users 4 may utilize, such as but not limited to, applications that allow for assigning actions, monitoring the actions, controlling devices, allowing or presenting use of devices to other users, or the like, as will be described herein. It should be understood that the applications 37 may be associated with and control the devices 50, or the applications 37 may be separate from specific dedicated devices 50, or may be a combination thereof (e.g., some applications 37 related to and used for controlling the devices 50, and some applications that are unrelated to the devices 50).

The other systems 40 may have components the same as or similar to the components described with respect to the one or more organization systems 10, the one or more user computer systems 20, and/or the one or more action systems 30 (e.g., one or more communication components, one or more processing components, and one or more memory devices with computer-readable instructions of one or more applications, one or more datastores, or the like). Thus, the one or more other systems 40 communicate with the one or more organization systems 10, the one or more user computer systems 20, the one or more action systems 30, and/or the devices 50 in same or similar way as previously described with respect to the organization systems 10, the user computer systems 20, and/or the action systems 30. The other systems 40, in some embodiments, may include third party systems and/or other systems that are used to allow operation of the devices 50 and/or may be gateway systems between the systems discussed herein. The other systems 40 may be merchant systems, social networking systems, systems associated with the devices 50, systems associated with the applications 27 on the user computer systems 20, or the like.

The devices 50 (e.g., as described with respect to FIGS. 2 and 3, or the like) are operatively coupled to the one or more organization systems 10, the one or more user computer systems 20, and the one or more action systems 30, through the network 2. The devices 50 have components the same as or similar to the components described for the one or more organization systems 10, the one or more user computer systems 20, the one or more action systems 30, and/or the other systems 40 (e.g., one or more communication components, one or more processing components, one or more memory components with computer-readable instructions, one or more applications stored in the one or more memory components, one or more datastores, or the like). Thus, the devices 50 communicate with the one or more organization systems 10, the one or more user computer systems 20, the one or more action systems 30, the one or more other systems 40, and/or each other in the same or similar way as previously described with respect to the one or more organization systems 10, the one or more user computer systems 20, the one or more action systems 30, and/or the other systems 40. As such, the communication components of the devices 50 may generally comprise a wireless transceiver, modem, server, electrical connection, or other component for communicating with other components on the network 2. The one or more communication components of the devices 50 may further include an interface that accepts one or more network interface cards, ports for connection of network components, Universal Serial Bus (USB) connectors and the like. Moreover, the one or more communication components of the devices 50 may include a keypad, keyboard, touch-screen, touchpad, microphone, mouse, joystick, other pointer component, button, soft key, and/or other input/output component(s) for communicating with the users 4.

Figure 2:
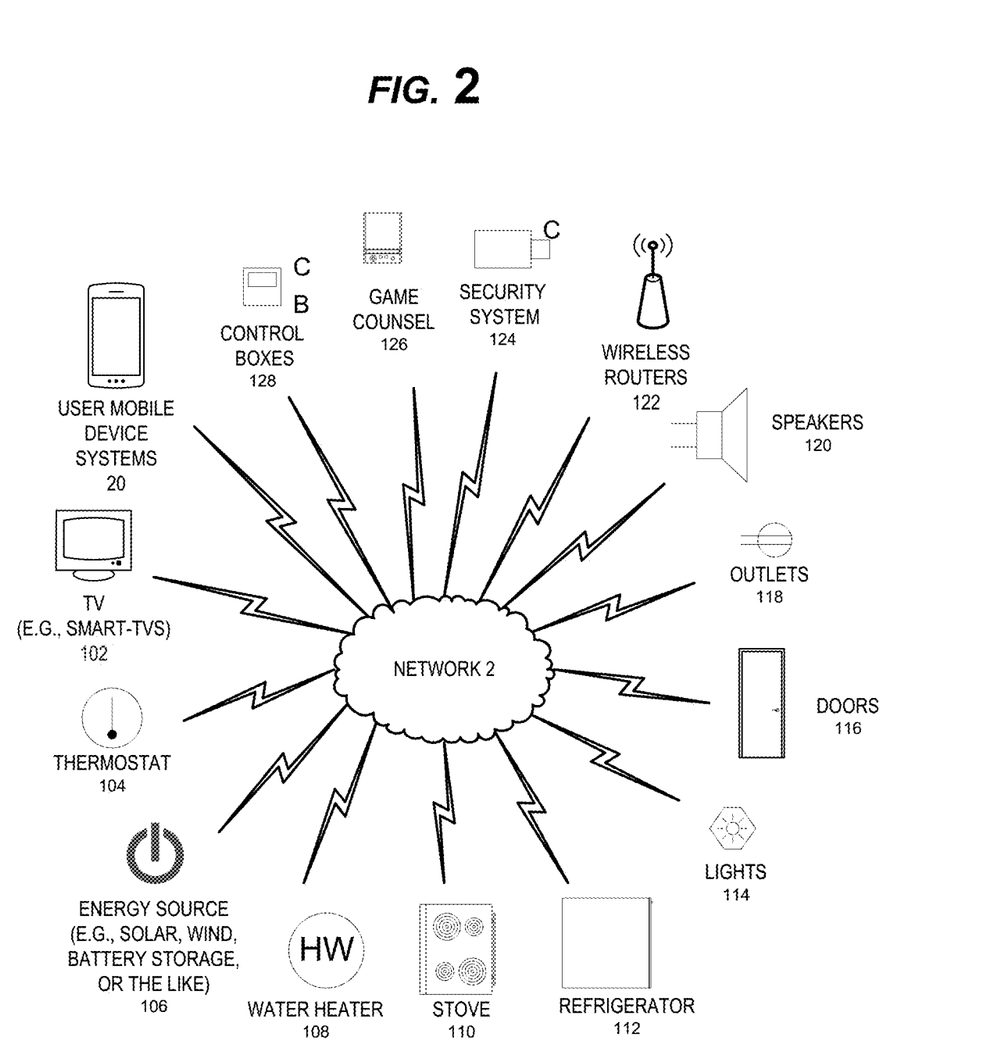
FIG. 2 illustrates a block diagram of linked home devices, in accordance with some embodiments of the invention.

As illustrated in FIG. 2, the devices 50 may include devices within a household environment 100, such as personal home devices (e.g., similar to mobile device systems, or the like), TVs 102 (e.g., smart-TVs), thermostats 104, home energy sources 106 (e.g., control alternative sources of energy such as use of solar, wind, battery storage, or other like devices including sources of energy that power personal devices 50), water heaters 108 (e.g., determine temperatures at which to set the hot water, when to turn on/off hot water heating based on user patterns), stoves 110, refrigerators 112, lights 114, doors 116, outlets 118, speakers 120, routers 122 (e.g., controlling on/off or use of wireless systems), security system 124 (e.g., remotely controlling a user's security system), gaming counsel systems 126, and/or any other control box devices 128 that may be integral with or attached to any of the forgoing (e.g., boxes not a part of a TV, but connected to a TV to allow "smart" functions, or the like), or other devices 50, such as any other smart appliance. As such, a primary user may remotely control or monitor (e.g., manually or allow automatic control of) any of these devices 50 through the use of one or more applications 27, or as described in further detail later, through the use of one or more action applications 37. These devices 50 may communicate over the network 2, as was previously described with respect to the action system environment 1 discussed and illustrated in FIG. 1. Moreover, the users 4 may send, or receive, any information captured by the devices 50 or used by the devices 50. Moreover, the one or more action applications 37 may require that dependent users perform some action (e.g., complete a task, start a task, or the like) before allowing the dependent users to use one or more of the devices 50, as will be described in further detail with respect to FIG. 4.

Figure 3:
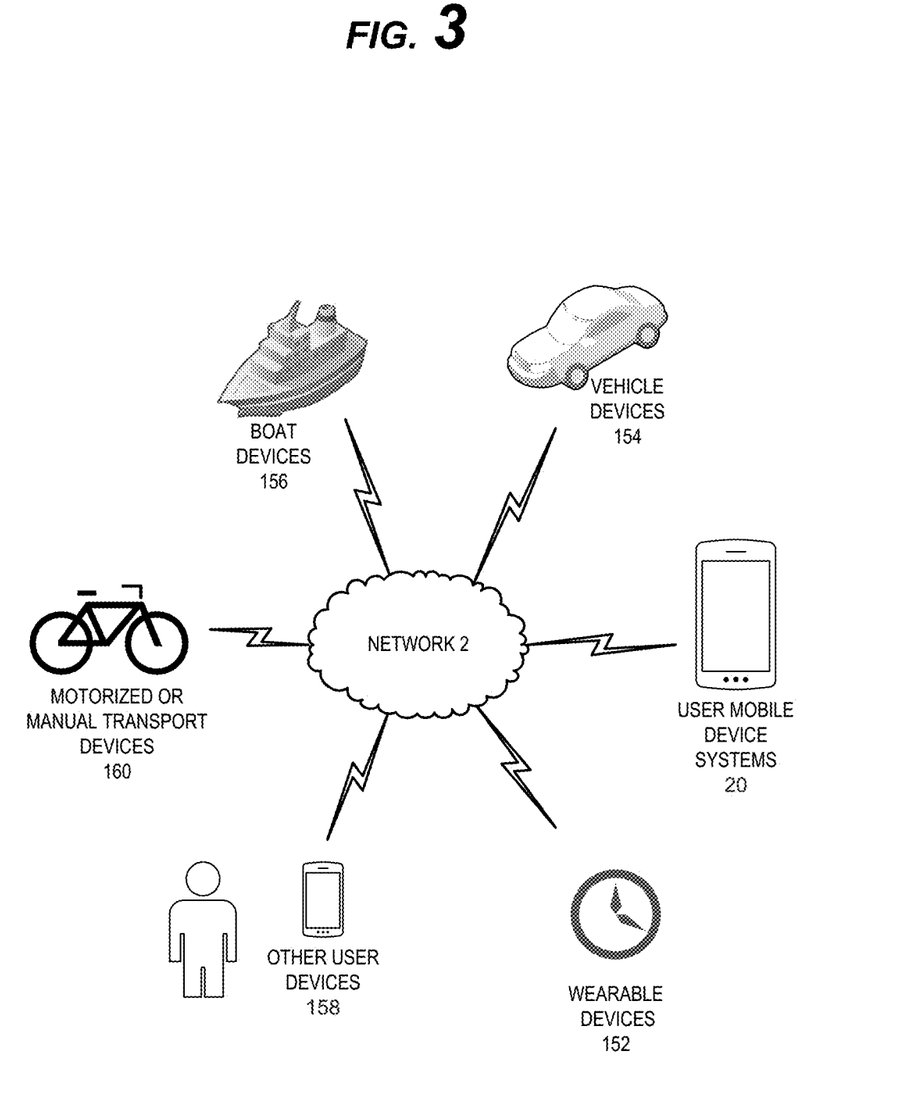
FIG. 3 illustrates a block diagram of linked personal devices, in accordance with some embodiment of the invention.

As illustrated in FIG. 3, the devices 50 may also include devices associated with a personal environment 150, such as a wearable devices 152 (e.g., watch, exercise band, glasses, device embedded into shirts, shoes, jewelry, skin, or the like that may monitor a user's location, exercise, stress, heat rate, distance traveled, or health related metrics, or may be used to enter into transactions, or the like), a vehicle device 154 (e.g., device integral in a car and/or attached to the car that monitors how and/or where a user drives, or the like), a boat device 156 (e.g., provides similar monitoring as the vehicle device), other motorized or manual transport (e.g., scooter (e.g., manual or motorized), cycle (e.g., bicycle, or the like), motorcycle, skateboard, or the like that provides similar monitoring as the vehicle device); devices of other users 158 (e.g., mobile devices of dependents, such as children or parents, employees, or the like). It should be understood that the vehicle devices 154, boat devices 156, and/or motorized transport devices and/or manual transport device 160, or the like may be collectively described as transport devices. The personal environment devices 150 may be included as a type of device 50, and as such, may be controlled and/or information may be sent from or to the users 4. As such, as previously discussed with respect to the household environment 100, the user 4 may control and monitor (e.g., manually or allow automatic control) any of these devices 50 in the personal environment 150 through the use of one or more user applications 27, or as described herein, through the use of the one or more organization applications 17 and/or the one or more action applications 37 in order to control the actions of the users. These personal environment devices 150 may communicate over the network 2, as was previously described with respect to the action system environment 1 discussed and illustrated in FIG. 1. Moreover, the user 4 may send, or receive, any information captured by the personal environment devices 150. It should be understood that the systems or devices 50 described herein may communicate with each other through the use of Wi-Fi connections, Bluetooth, NFC, other wireless connections, physical connections, or the like.

It should be further understood that the home devices 100 and/or the personal environment devices 150 may be broken down into action devices, through which dependent users may be required to undertake and action, and entertainment devices which may be controlled (e.g., locked, paused, suspended, allow full access, limited access, or the like) in order to motivate the dependent users to complete the actions and the action devices before the dependent users can use a least a portion of the entertainment devices. The control of the devices is discussed in further detail herein with respect to FIG. 4.

Typically, a user 4 may be required to authenticate his/her identity for access to a device 50 (including an application associated therewith), or for access to a particular feature, function or action of a device 50 (or application therein). Numerous types and levels of user authentication exist. For example, a user 4 may authenticate his/her identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication.

The different types of authentication may provide differing degrees of confidence regarding the authentication using such types. For example, if a username by itself is used for a first user authentication, and a username along with a password is used for a second authentication, then the second authentication should provide a higher confidence regarding the authentication because of the additional layer of authentication required. Further, within the types of authentication, varying levels of confidence may be used. For example, when using a password, an administrator may require users to create a password according to strict rules designed to increase the security level of the password, and therefore increase the confidence of any authentication using the password.

Accordingly, a continuum of authentication may be used to quantify (or dictate) the levels of authentication. Likewise, a continuum of functions permitted may be used to quantify (or dictate) the number or context in which functions are permitted.

In some embodiments of the invention one or more of the systems described herein may be combined with each other, or otherwise perform the functions of the other systems described herein. In other embodiments of the invention, one or more of the applications described herein may be combined with each other, or otherwise perform the functions of the other applications described herein. Furthermore, the applications may be any type of application, such as an application stored on a desktop, server, or other device, a mobile application stored on a mobile device, a cloud application, or other like application. As such, the applications described herein, or portions of the applications described herein, may be stored and operated on any of the systems or devices 50 described herein. For example, a portion of the action applications 37 may be stored on the user computer systems 20 and/or organization systems 10, in order to achieve the inventions described herein.

It should be understood, that the systems and devices 50 described in FIGS. 1-3, or other devices not specifically described herein, may be configured to establish a communication link with each other in order to accomplish the steps of the processes described herein. The link may be an internal link within the same entity (e.g., within the same organization or device provider) or a link with the other systems of entities (e.g., social networking systems, third-party systems, or the like). In some embodiments, the systems may be configured for monitoring the devices 50, and the applications thereof, that the user utilizes. The information received from monitoring may be provided via wireless network path portions through the Internet. When the systems or devices 50 are not monitoring a source or are not being monitoring, the information need not be transmitted from the source through the Internet to the destination, although it could be. The sources of information may be made continuously available, however, continuously available does not necessarily mean that the sources actually continuously generates data, but that a source is continuously available to generate and send data real-time (e.g., instantaneously and/or within a few seconds, or the like) of receiving a request for it. In any case, the sources may be continuously available to receive and/or generate information, in some cases in digitized data in Internet Protocol (IP) packet format. In response to continuously monitoring the real-time data feeds from the various systems or devices 50, the system may be configured to provide information to the user 4 and/or allow the user 4 to make changes to or control the devices 50 and/or applications thereof.

Moreover, it should be understood that the process flows described herein include transforming the information sent and/or received from the applications of the different systems (e.g., internally or externally) and/or the devices 50 from one or more data formats into a data format associated with the various systems and/or devices for display to the users on the user computer systems 20 and/or devices 50. There are many ways in which information is converted within the action system environment 1. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may include converting to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

In some embodiments, the action application 37 (or other application discussed herein) provides an interactive integrated interface on one or more devices 50 (e.g., including one or more user computer systems 20, or the like). The interactive integrated interface may comprise one or more interfaces or dashboards, comprising audio, visual and/or tactile elements, presented on the device 50. In some embodiments, the interactive interface may comprise an action interface that allows a primary user to assign actions to dependent users, monitor the status of the actions, control the use of devices 50 (e.g., including applications thereof) by the dependent users, or the like. For example, the integrated interface may allow a primary user to assign various actions to a dependent user one multiple devices 50 that are not controlled by the same entity. Moreover, the primary user may control (e.g., lock, disable, or the like) particular devices until the dependent user completes various action. The control of multiple unrelated devices may be allowed through a single integrated interface. As such, devices 50 may be controlled such that the occurrence of the action (e.g., starting a device, completing an action through a device, or the like) must be completed by one or more of the dependent users before one or more devices 50 become operable for the one or more dependent users.

Figure 4:
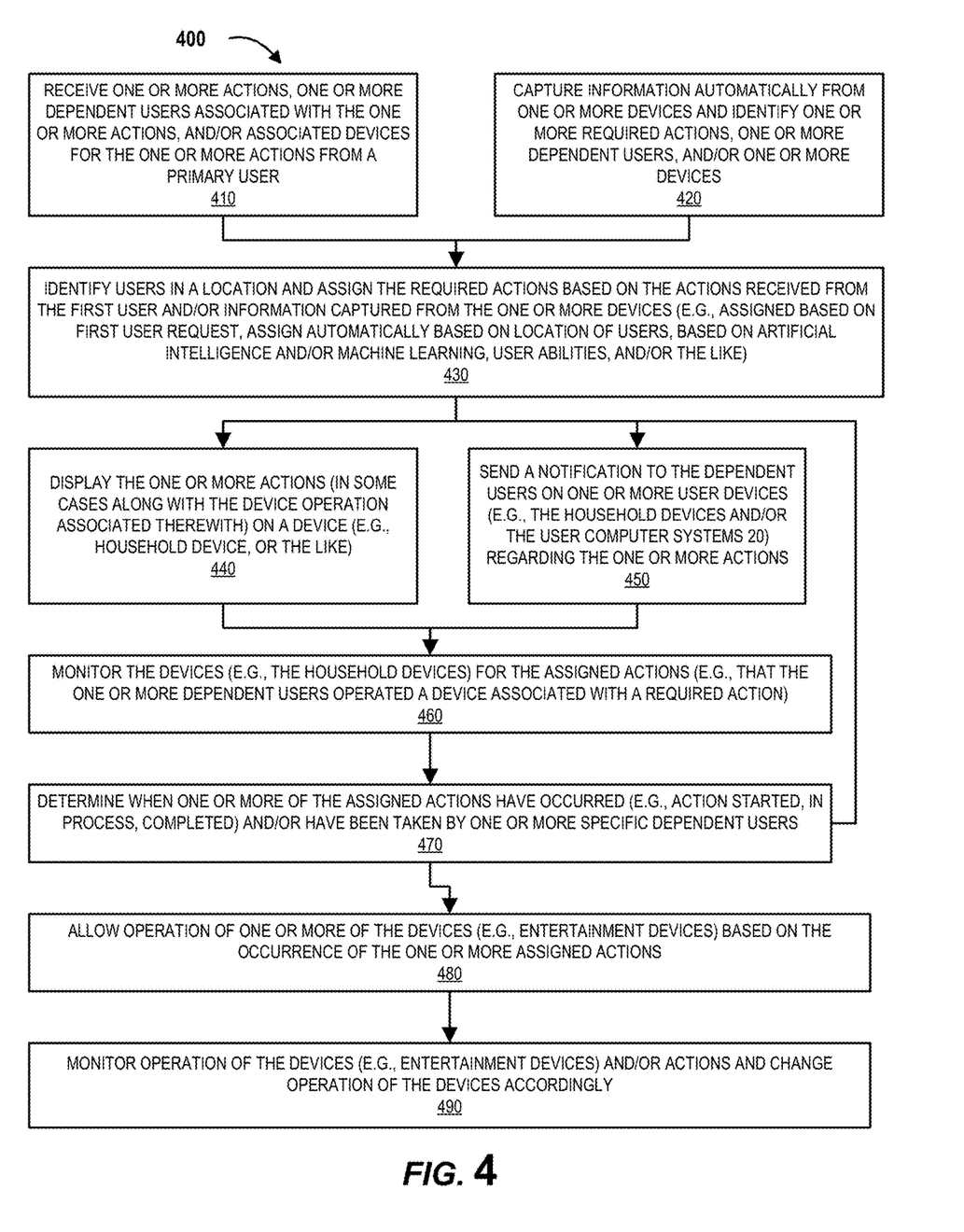
FIG. 4 illustrates a process flow for an action and device assignment, monitoring, and control process, in accordance with some embodiments of the invention.

FIG. 4 illustrates an action assignment and device control process 400, through which a primary user may assign actions to dependent users, monitor the occurrence of the actions, and control the devices 50 (e.g., including the applications therein) that a dependent user may utilized by completing the action.

FIG. 4 illustrates in block 410 that the system (e.g., organization system 10, action system 30, and/or other system depending on how the system environment operates) receives one or more actions and/or associated device operation (e.g., access, use, restrictions, or the like) based on the occurrence of the one or more actions (e.g., the action is started, in process, completed, or the like). As such, a primary user may set actions for a dependent user to undertake before the dependent user is allowed to use at least a portion of one or more particular devices 50. For example, a primary user may be a parent, guardian, or other head of household and the devices may be located in one or more locations (e.g., a household, office, or other location). Moreover, it should be understood that the one or more actions may include tasks for one or more dependent users in the one or more locations to undertake. The one or more dependent users may be kids, dependent people at a location, housemates, employees, or others users. The actions, may be tasks, such as chores around the house, that are related to specific devices, for example: tasks may be completed using one or more of the devices 50 (e.g., doing laundry which requires the washer to dryer to be activated); tasks may be viewed by one or more devices 50 (e.g., security cameras may monitor the dependent users for the occurrence of actions—dog was let out, dependent is home alone, etc.); tasks may be payments owed to the primary user (e.g., dependent user makes a payment to the primary user—e.g., rent is paid, or the like); tasks may include operating of one of the devices (e.g., dependent turns on the oven, stove, other appliance); task may require completion of a cycle for one of the devices (e.g., lawn mower has been run X amount of time); task may include turning off one of the devices (e.g., dependent user turns off the video games or TV in order to access food, use a computer, or the like); tasks may require using items in a particular location (e.g., vacuum cleaner has been operated in a particular room, or the like); or any other like actions with one or more of the devices at one or more of the locations. The system may store the one or more actions (e.g., required actions that must occur before the use of a device—the same device or a different device— is allowed), store the one or more primary and/or dependent users assigned to the one or more actions, and/or store the one or more devices associated with the one or more actions.

Block 420 of FIG. 4 illustrates that in addition to, and/or alternative to, a primary user setting the one or more actions, the one or more dependent users for the one or more actions, and/or the one or more associated devices that may be utilized after the occurrence of the actions, this information may be determined based on the one or more devices 50 themselves. For example, the one or more devices 50 may be devices (e.g., mobile devices of the users, cameras, personal assistant devices independent from or located within appliances, vehicles or other transportation devices, or the like) which may be used to identify the one or more dependent users present at the location (e.g., in the household, at an office, or other location). For example, location determining components, microphone components, video components, or the like within the one or more devices 50 may be used to determine the one or more dependent users present at the location, one or more actions that need to be completed at the location, and/or one or more devices 50 associated with the one or more actions and/or the one or more dependent users. For example, the one or more dependent users at the house may be determined by the mobile devices, wearable devices, tracking of transportation devices, security cameras, microphones, or the like at the location. In some embodiments, the actions required may be based on use of devices or lack thereof at the location. For example, food automatically determined by the refrigerator may indicate that a dependent user needs to go to the store, a security camera or smart lock that hasn't detected that a door has opened may indicate that a pet has not be taken care of, a laundry device or dishwasher may indicate that it is loaded (e.g., based on weight), but hasn't been turned on, or the like. As such, an action in response to this automatic detection may be identified, such as, an action to purchase food, let the pet out, turn on the appliance, or the like may be automatically identified. In other examples, a TV or gaming counsel may have been on for too long (e.g., based on watching times of the dependent users located at the location) and an action may be identified for the dependent user (e.g., turning off the device, and/or preventing operation of other devices). In still other examples, the automatically determined actions may include the transfer of funds, such as payments that a dependent user (e.g., roommate) may owe a primary user for rent, shared bills, or the like.

It should be understood that some examples have been provided herein of automatic determination of actions for dependent users and/or devices, but it should be understood that any automatic determination of an action for dependent users and/or devices may be determined through the operation of a device 50, or lack thereof. Moreover, it should be understood that automatic determination of actions for dependent users and/or devices may be determined by artificial intelligence and/or machine learning based on historical assignments of actions (e.g., what actions dependent users have been assigned in the past), skills of the dependent users (e.g., what dependent users can drive, operate the lawnmower, cook, or the like), actions already undertaken by the dependent users (e.g., users that have already completed chores for the day and users that haven't), or any other like information that may be used to automatically determine actions, devices, and/or dependent users.

As such, it should be understood that between the primary user and/or the one or more devices 50 at the location (e.g., associated with the location and/or the one or more dependent users at the location) the one or more actions, the one or more dependent users (e.g., associated with the actions), and/or the one or more devices (e.g., associated with the actions) may be set and stored by the system. It should be understood that the actions, dependent users assigned to the actions, and/or the devices that may be used, may all be managed through and integrated action interface. The integrated action interface may be used to set and store the actions for the dependent users and the devices that may be utilized for the actions (i.e., the action devices), as well as the devices that the dependent users may use after the actions occur (e.g., the allowed entertainment devices). This integrated action interface may incorporate the controls of various devices 50 (including applications thereof) in order to allow the primary user to control multiple devices in a centralized location, which are typically controlled by different applications, through different entities, and/or different interfaces.

Block 430 of FIG. 4 further illustrates that the system (e.g., one or more of the systems depending on how the environment operates) identifies, based on the primary user input and/or automatic input, the one or more dependent users in a particular location and assigns the actions received from the primary user and/or from the information captured from the one or more devices 50 in the locations. For example, in some embodiments of the invention, the one or more devices 50 may determine the one or more dependent users at the location, such as a household, and assigns the actions to the one or more dependent users (e.g., when the user arrives at the location such as when the user gets home from school, at a particular time just before dinner, or the like). In some embodiments of the invention, as previously discussed above, the actions may be assigned in a number of different ways, such as: based on the primary user's request (e.g., who the primary user assigns to a task); the location of the one or more dependent users (e.g., task may be reassigned based on the dependent users present—that is, actions may be assigned to a different user than the primary user assigned); user abilities (e.g., skills, actions previously assigned to the user by the primary user, actions for which each user is responsible, or like). Moreover, as previously discussed with respect to determining actions, dependent users, and/or devices, artificial intelligence and/or machine learning may be used to identify the location of users and when to assign the actions to the users (e.g., based on the factors previously discussed herein).

Regardless of how the one or more dependent users are assigned to the one or more actions, the one or more dependent users may be notified of the one or more actions by the system, such as through the use of a display on one or more of the devices 50 near the user and/or through sending a notification to the one or more dependent users (e.g., on the user computer system 20).

As illustrated in block 440 of FIG. 4, the one or more actions assigned to the one or more dependent users may be displayed on the one or more devices 50 in the location of the one or more users. For example, an action assigned to the one or more dependent users may be displayed on an interface of a personal home assistant, that may be a stand-alone device (e.g., a device that plays music, searches the Internet, or the like), may be incorporated into an appliance or entertainment system (e.g., a display on a refrigerator, on a smart TV, through a smart device coupled to a TV, through a gaming device, or the like), may be incorporated into the user devices (e.g., mobile device, wearable device, or the like), or provided through an interface coupled to any of the devices 50. For example, a display on the interface of one of the devices may list the dependent users, the actions assigned to the dependent users, the action devices associated with the actions (e.g., the devices through which the action should be performed, if needed) and the entertainment devices that are being controlled (e.g., devices that are "locked"—can't be used until the actions are completed). It should be also understood that details may be provided regarding how each actions should be completed. For example, the action may be to cook food for dinner, and the action provides on the interface a recipe with ingredients and instructions for making the food. Alternatively, the action may including cleaning something at the location with instructions on what to clean and how to clean it. The action may include a list of errands that requires the dependent user to go to various locations (e.g., which can be tracked through the user's vehicle, user computer device, wearable device or the like). It should be understood that the interface may act as a "to-do-list" that can be created monitored, and/or changed by the primary user and/or the system automatically.

Block 450 of FIG. 4 further illustrates that a notification may be sent to the one or more dependent users one or more of the devices 50. The notification can be sent to the dependent users on the user computer systems 20; however, the dependent users may ignore some messages sent to them through this channel (e.g., the dependent users may ignore text messages, or the like). As such, the notifications may also be sent to the dependent user on the one or more devices 50 located at the location. The notification may be simple messages, such as a written message, but it may alternatively or additionally, be a voice message from the primary user (or other automated voice message). The notification may be presented to the dependent users through devices 50 that are currently being operated at the location, such as but not limited to, a smart TV that the user is using, a game console, refrigerator, stand-alone personal assistant device, or the like. In some embodiments, being able to present the notification to not only the user computer system 20, but also different devices 50 (e.g., action devices and/or entertainment devices) at the location may increase the chances that the dependent user actually performs the assigned action. Moreover, it should be understood that in some embodiments the notifications appearing on the one or more devices 50 may also prevent use of the one more devices 50 until the dependent user acknowledges the action, undertakes the action, or the like. As such, the primary user may control use of the devices 50 (e.g., entertainment devices) by sending notifications manually and/or automatically to the specific devices that the dependent users are currently using.

FIG. 4 further illustrates in block 460, that the devices 50 (including the applications thereof) are monitored in order to determine if the assigned dependent user is undertaking the assigned action. In some embodiments, the monitoring may include simply determining that the action has occurred. For example, that the dependent user has made purchases (e.g., monitoring the dependent user's transactions in order to determine if the user has gone to the store to buy the required products), has turned on the appliance (e.g., laundry, stove, vacuum cleaner, lawnmower, or the like), made a transfer of funds as required by the primary user (e.g., to pay for shared bills, rent, or the like), has taken care of the pets (e.g., through monitoring of security camera, pet location determining chip, or the like), or taken another assigned action. In some embodiments, the monitoring may comprise monitoring the location of the user when the action was taken. For example, that if the dependent user that was assigned to the action was in the location of the device 50 when the action was taken (e.g., at the general location—at the house, in the specific location—at the device, or the like). For example, the action may not be complete if the dependent user that was supposed to take the action was not at the house or was not near the appliance when the action was taken (e.g., indicating that another user took the action—another user started the laundry, went shopping, cooked dinner, or the like). Moreover, as illustrated by block 470 of FIG. 4, the system determines when one or more of the required actions occurred. For example, the occurrence of the action may occur over a particular time period through a number of sub-actions. For example, the action may include determining when the action has started, the status of the action in-process, and/or when the action has been completed. For example, the occurrence of different steps may result in the allowance or blocking of use of particular devices 50. As such, when the action has begun, the system may allow the dependent user to use device (e.g., entertainment device, such as a TV), but such continued use of the device (e.g. TV) may be contingent on the continuation of the action and/or completion of the action (e.g., completion of the washing and drying cycles, completion of the food preparation, completion of the transactions for various errands, or the like).

Block 480 of FIG. 4, further illustrates that upon the occurrence of the action, the system may allow for use of the one or more devices that were previously restricted (e.g., locked, blocked, or the like). For example, the system may allow the dependent user to be able to use a device (or application thereon) that was previously restricted from use before the user undertook the assigned action. For example, once the dependent user has undertaken the assigned action, the system may unrestrict (e.g., unlock, unblock, or the like) the use of an entertainment device (e.g., smart TV, wireless connection, Internet connection, computer system, gaming console, streaming service on the device, particular game on the console, or the like). It should be understood, that the use of a particular device could be limited to a specific user, such as only the dependent user that undertook his/her action, and not other dependent users that have fail to undertake his/her assigned action. In other examples, use of other devices, such as transportation devices, such as bikes, scooters, cars, boats, or the like may be allowed only after the assigned action has been undertaken (e.g., started, completed, or the like). As such, it should be understood that the use of particular devices at the location may be controlled as the primary user sees fit with respect to the assigned dependent users taking the assigned actions.

Block 490 of FIG. 4 illustrates that the system may also monitor the operation of the devices 50 at the location and/or the actions over time and change the operation of the devices 50 accordingly. That is, the use of the devices 50 may have limits (e.g., limits on time of use, limits on the dependent users, limits on use if actions are not continued and/or completed, or the like) such that should a dependent user violate a limit the use of the one or more devices 50 may be changed (e.g., stopped, paused, altered, or the like). For example, using the device longer than allowed, not completing the action (e.g., failing to finish the laundry, failing to provide the share of funds for bills, failing to take care of pets, failing to transport other dependent uses to the required location, or the like) may result in the restriction of the devices. Alternatively, the use of devices and/or the location of multiple users may be monitored, and in response use of the devices may be restricted automatically when a particular user is nearby. For example, a first dependent user may be allowed to use the smart TV because the first dependent user completed an action; however, when a second dependent user is identified at the house (e.g., based on GPS, camera location, mobile device location, or the like) the device may be restricted so that the second dependent user cannot use the device.

As such, as described throughout in the specification, the present invention may be utilized by one or more primary users to assign actions, monitor the actions, and/or control devices (e.g., allow and/or prevent use of the devices) based on the occurrence of the actions. In this way the one or more primary users may be able to use interfaces of devices located at a particular location in order to control the actions assigned to users and/or control the use of devices at the location, even when the one or more primary users are not at the location. Moreover, artificial intelligence and/or machine learning may be utilized in order to optimize and/or change assigned actions and/or to control devices automatically without constant review of the one or more primary users. Additionally, notifications may be displayed to the one or more dependent users on multiple devices (e.g., other than just the user computer systems) in order to make it more likely for the dependent users to actually take the actions assigned to them.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A system for controlling devices based on action occurrence, the system comprising:
one or more memory devices having computer readable code stored thereon; and
one or more processing devices operatively coupled to the one or more memory devices, wherein the one or more processing devices are configured to execute the computer readable code to:
communicate with one or more action devices to automatically capture operation information from the one or more action devices, wherein the operation information comprises use or failure of use of the action devices within a time period or for a length of time;
identify, based at least in part on input from one or more primary users and the operation information captured from the one or more action devices, one or more actions for one or more dependent users to undertake using the one or more action devices;
receive data indicating user abilities and user location for each of the one or more dependent users;
assign the one or more actions to the one or more dependent users based on the input from one or more primary users and at least one of the user abilities or the user location for each of the one or more dependent users; notify the one or more dependent users of the one or more actions;
monitor the one or more action devices for occurrence of the one or more actions; and
control operation of one or more entertainment devices based on the occurrence of the one or more actions by the one or more dependent users;
wherein the one or more entertainment devices are different than the one or more action devices.

2. The system of claim 1, wherein assigning the one or more actions for the one or more dependent users comprises at least identifying a location for the one or more dependent users and assigning the one or more actions based at least in part on the location of the one or more dependent users.

3. The system of claim 1, wherein assigning the one or more actions comprises the one or more primary users assigning the one or more actions to the one or more dependent users.

4. The system of claim 1, wherein the operation information automatically captured from the one or more action devices comprises an indication that the one or more action devices are operating.

5. The system of claim 1, wherein a first action of the one or more actions is assigned to one of the one or more dependent users located away from a household, and wherein a second action is assigned to another of the one or more dependent users located at the household.

6. The system of claim 1, wherein assigning the one or more actions for the one or more action devices comprises:
identifying abilities of the one or more dependent users; and
assigning one of the one or more actions to one of the one or more dependent users and another of the one or more actions to another of the one or more dependent users based on the abilities of the one or more dependent users.

7. The system of claim 1, wherein notifying the one or more dependent users of the one or more actions assigned comprises displaying the one or more actions and the one or more action devices used for the one or more actions on an interface on the one or more action devices.

8. The system of claim 1, wherein notifying the one or more dependent users comprises sending a notification to a user computer system of the one or more dependent users.

9. The system of claim 1, wherein monitoring the one or more action devices for the occurrence of the one or more actions comprises determining when the one or more actions are completed, and wherein controlling the operation of the one or more entertainment devices comprise allowing the one or more dependent users to use the one or more entertainment devices.

10. The system of claim 1, wherein monitoring the one or more action devices for the occurrence of the one or more actions comprises determining when the one or more actions have failed to occur, and notifying the one or more dependent users when the one or more actions have failed to occur.

11. The system of claim 1, wherein the one or more action devices comprise a personal household assistant, a smart thermostat, a smart stove, a smart refrigerator, a smart washer, a smart dryer, a smart door, a smart pet device, or a smart appliance.

12. The system of claim 1, wherein the one or more entertainment devices comprises a user mobile device, a smart TV, smart speakers, a router, a game counsel, a transportation device, or a wearable device.

13. The system of claim 1, wherein the one or more actions are chores for the dependent users to complete at a shared location of the one or more dependent users and the one or more primary users.

14. A computer implemented method for controlling devices based on action occurrence, the method comprising:
   communicate, by, one or more processing components, with one or more action devices to automatically capture operation information from the one or more action devices, wherein the operation information comprises use or failure of use of the action devices within a time period or for a length of time;
   identifying, by the one or more processing components, based at least in part on input from one or more primary users and the operation information captured from the one or more action devices, one or more actions for one or more dependent users to undertake using one or more devices;
   receiving data indicating user abilities and user location for each of the one or more dependent users;
   assigning, by the one or more processing components, the one or more actions to the one or more dependent users based on the input from one or more primary users and at least one of the user abilities or the user location for each of the one or more dependent users;
   notifying, by the one or more processing components, the one or more dependent users of the one or more actions;
   monitoring, by the one or more processing components, the one or more action devices for occurrence of the one or more actions; and
   controlling, by the one or more processing components, operation of one or more entertainment devices based on the occurrence of the one or more actions by the one or more dependent users;
   wherein the one or more entertainment devices are different than the one or more action devices.

15. The method of claim 14, wherein assigning the one or more actions for the one or more dependent users comprises at least identifying a location for the one or more dependent users and assigning the one or more actions based at least in part on the location of the one or more dependent users.

16. The method of claim 14, wherein the one or more action devices comprise a personal household assistant, a smart thermostat, a smart stove, a smart refrigerator, a smart washer, a smart dryer, a smart door, a smart pet device, or a smart appliance, and wherein the one or more entertainment devices comprises a user mobile device, a smart TV, smart speakers, a router, a game counsel, a transportation device, or a wearable device.

17. A computer program product for controlling devices based on action occurrence, the computer program product comprising at least one non-transitory computer-readable medium having computer-readable program code portions embodied therein, the computer-readable program code portions comprising:
   an executable portion configured to communicate with one or more action devices to automatically capture operation information from the one or more action devices, wherein the operation information comprises use or failure of use of the action devices within a time period or for a length of time;
   an executable portion configured to identify, based at least in part on input from one or more primary users and the operation information captured from the one or more action devices, one or more actions for one or more dependent users to undertake using the one or more action devices;
   an executable portion configured to receive data indicating user abilities and user location for each of the one or more dependent users; an executable portion configured to assign the one or more actions to the one or more dependent users based on the input from one or more primary users and at least one of the user abilities or the user location for each of the one or more dependent users;
   an executable portion configured to notify the one or more dependent users of the one or more actions;
   an executable portion configured to monitor the one or more action devices for occurrence of the one or more actions; and
   an executable portion configured to control operation of the one or more entertainment devices based on the occurrence of the one or more actions by the one or more dependent users;
   wherein the one or more entertainment devices are different than the one or more action devices.

18. The computer program product of claim 17, wherein assigning the one or more actions for the one or more dependent users comprises at least identifying a location for the one or more dependent users and assigning the one or more actions based at least in part on the location of the one or more dependent users.

19. The computer program product of claim 17, wherein the one or more action devices comprise a personal household assistant, a smart thermostat, a smart stove, a smart refrigerator, a smart washer, a smart dryer, a smart door, a smart pet device, or a smart appliance, and wherein the one or more entertainment devices comprises a user mobile device, a smart TV, smart speakers, a router, a game counsel, a transportation device, or a wearable device.

* * * * *